(12) United States Patent
Fox

(10) Patent No.: US 9,869,421 B2
(45) Date of Patent: Jan. 16, 2018

(54) SUPPORT INSULATION SYSTEMS AND INSULATING SUPPORT BODY SECTIONS FOR HOLDING AND SUPPORTING PIPES AND RELATED METHODS

(71) Applicant: NiTech Corporation, South Pomfret, VT (US)

(72) Inventor: Steve A. Fox, South Pomfret, VT (US)

(73) Assignee: NiTech Corporation, Durham, NC (US)

( * ) Notice: Subject to any disclaimer, the term of this patent is extended or adjusted under 35 U.S.C. 154(b) by 0 days.

(21) Appl. No.: 14/996,755

(22) Filed: Jan. 15, 2016

(65) Prior Publication Data

US 2016/0281905 A1     Sep. 29, 2016

Related U.S. Application Data

(60) Provisional application No. 62/138,201, filed on Mar. 25, 2015.

(51) Int. Cl.
*F16L 59/02* (2006.01)
*F16L 3/10* (2006.01)
(Continued)

(52) U.S. Cl.
CPC ............... *F16L 59/024* (2013.01); *F16L 3/10* (2013.01); *F16L 59/021* (2013.01);
(Continued)

(58) Field of Classification Search
CPC ....... F16L 59/024; F16L 59/028; F16L 59/12; F16L 59/135; F16L 3/2235; F16L 3/26;
(Continued)

(56) References Cited

U.S. PATENT DOCUMENTS 2,361,943 A * 11/1944 Issoglio ................ F16L 3/2235
174/135
2,937,835 A * 5/1960 Csmereka ............. F16L 3/1091
248/68.1

(Continued)

OTHER PUBLICATIONS

Armacell Advanced Insulation, "Armafix Insulation Pipe Hanger" installation brochure, Oct. 2013.

(Continued)

*Primary Examiner* — Nkeisha Smith
(74) *Attorney, Agent, or Firm* — J. Bennett Mullinax, LLC

(57) ABSTRACT

Insulated pipe support apparatuses, systems and related methods are disclosed herein. An insulating support body section of support insulation for holding and insulating pipes installed within a structure can include a pipe receiving portion having a mounting side and a receiving side. The mounting side can have a mounting surface being configured to reside adjacent a mounting surface of a structure. At least one channel can be formed within the pipe receiving portion through the receiving side such that the pipe receiving portion forms side walls of the channel, the at least one channel being configured to receive one or more pipes with the side walls of the channels having a strength to support the section of pipe extending through the channel without need for additional weight bearing supports. The insulating support body section can have a thermal conductivity that is less than the thermal conductivity of the pipes that are to be inserted into the respective channels.

5 Claims, 9 Drawing Sheets

(51) Int. Cl.
*F16L 59/12* (2006.01)
*F16L 59/135* (2006.01)
*F16L 3/223* (2006.01)
*F16L 3/26* (2006.01)

(52) U.S. Cl.
CPC ............. *F16L 59/028* (2013.01); *F16L 59/12* (2013.01); *F16L 59/135* (2013.01); *F16L 3/2235* (2013.01); *F16L 3/26* (2013.01)

(58) Field of Classification Search
CPC ..... F16L 3/23; F16L 3/237; F16L 3/24; F16L 3/223; F16L 3/227; F16L 3/10; F16L 3/04; F16L 3/1091; F16L 3/1008; F16L 3/02; F16L 3/00; F16L 3/1033; F16L 3/12; F16L 3/08; F16L 59/021; B23P 19/10; B23P 19/04; H02G 3/22; H02G 3/30
USPC .................. 248/68.1, 65, 73, 74.4, 49, 74.2
See application file for complete search history.

(56) References Cited

U.S. PATENT DOCUMENTS

| | | | | |
|---|---|---|---|---|
| 3,180,598 | A * | 4/1965 | Girard | F16L 3/222 |
| | | | | 248/68.1 |
| 5,192,039 | A | 3/1993 | Williams | |
| 5,284,204 | A | 2/1994 | Morgan | |
| 5,294,156 | A * | 3/1994 | Kumazaki | F25B 41/003 |
| | | | | 285/124.2 |
| 6,089,513 | A * | 7/2000 | Cau | B60K 15/01 |
| | | | | 248/68.1 |
| 6,126,119 | A | 10/2000 | Giangrasso | |
| 6,460,576 | B2 | 10/2002 | Vitoorapakorn | |
| 6,540,531 | B2 * | 4/2003 | Syed | H01R 9/0524 |
| | | | | 174/68.3 |
| 6,602,016 | B2 * | 8/2003 | Eckart | F16L 3/1033 |
| | | | | 403/110 |
| 6,823,899 | B2 | 11/2004 | Weibel et al. | |
| 8,348,204 | B2 * | 1/2013 | Kataoka | B61D 49/00 |
| | | | | 174/135 |
| 8,616,506 | B2 * | 12/2013 | Milton | H02B 1/305 |
| | | | | 248/65 |
| 8,695,929 | B2 * | 4/2014 | Cox | H02G 3/0493 |
| | | | | 174/100 |
| 9,038,967 | B2 * | 5/2015 | Struck | F16L 57/04 |
| | | | | 248/68.1 |
| 9,400,066 | B2 * | 7/2016 | Barre | F16L 3/1091 |
| 2005/0173597 | A1 * | 8/2005 | Farrell | F16L 3/22 |
| | | | | 248/68.1 |
| 2006/0091266 | A1 * | 5/2006 | Leiser | B29C 45/14614 |
| | | | | 248/68.1 |
| 2007/0114197 | A1 * | 5/2007 | Remmers | A47B 96/021 |
| | | | | 211/153 |
| 2009/0218451 | A1 * | 9/2009 | Lundborg | F16L 5/02 |
| | | | | 248/56 |
| 2010/0148018 | A1 * | 6/2010 | Schoenau | F16L 5/14 |
| | | | | 248/74.4 |
| 2012/0280092 | A1 * | 11/2012 | Barre | F16L 3/237 |
| | | | | 248/68.1 |
| 2015/0001351 | A1 * | 1/2015 | Krager | H02G 3/32 |
| | | | | 248/49 |
| 2015/0144746 | A1 * | 5/2015 | Stewart | A61M 5/1418 |
| | | | | 248/67.5 |
| 2015/0192225 | A1 * | 7/2015 | Vo | F16L 3/1091 |
| | | | | 248/67.5 |
| 2016/0050904 | A1 * | 2/2016 | Turner, Jr. | A01M 29/30 |
| | | | | 49/464 |
| 2016/0076689 | A1 * | 3/2016 | Kato | F16L 55/035 |
| | | | | 248/636 |
| 2016/0334044 | A1 * | 11/2016 | Koenig | F16L 55/035 |

OTHER PUBLICATIONS

K-Flex 360 Insulation Pipe Support Product Sheet, http:/www.nomacokflx.com/Accessories/k360.asp, downloaded Mar. 26, 2007.
Insulation FACTS #85, "Information from NAIMA: Facts About Insulation Requirements for Plastic Piping," www.naima.org, Pub. No. CI226, Jul. 2013.
Alliance for PE Pipe, "High-Density Polyethylene Pipe, The Smart, Safe Choice for Municipal Water," brochure, at least as early as Sep. 2015.
Armafix Insulation Pipe Hanger Installation sheet, published prior to 2008.

* cited by examiner

SUPPORT INSULATION SYSTEMS AND INSULATING SUPPORT BODY SECTIONS FOR HOLDING AND SUPPORTING PIPES AND RELATED METHODS

RELATED APPLICATION

The presently disclosed subject matter claims the benefit of U.S. Provisional Patent Application Ser. No. 62/138,201, filed Mar. 25, 2015, the disclosure of which is incorporated herein by reference in its entirety.

TECHNICAL FIELD

The present subject matter relates to insulated pipe support apparatuses, systems and related methods. In particular, the present subject matter relates to insulation systems and insulating support body sections for insulating and support pipes within structures such as buildings and methods related thereto.

BACKGROUND

In conventional copper, steel, or other rigid hot or cold water pipes the piping is rigid and self-supporting such that foam PE, rubber, or fiberglass pipe insulation of tubular construction with ⅜ to 1 inch wall thickness is slit and installed over the piping to prevent heat or cooling loss to the environment and thus save energy. In the case of cold water, this insulation also prevents condensate from forming on the pipe and dripping onto surrounding surfaces. This dripping can create moisture damage or mold over long time spans. Also, for very cold unheated areas, insulated pipes can prevent freezing and bursting of pipes.

With the recent increasing use of plastic tubing and more recently PEX (crosslinked polyethylene) tubing for hydronic heating and cooling as well as for supplying hot and cold water for domestic use and other applications, the insulation of this tubing is difficult because the tubing is flexible and also because it expands and becomes more flexible as its temperature increases. Typically the tubing, usually ½ to 1 inch outside diameter, is supported with hangers spaced every 1 to 3 feet to prevent excessive sagging. These hangers have a small width of about ½ of an inch to about an inch.

A typical tube of ½ inch outside diameter will be supported with a hanger attached to the floor joist or other structural member every 18 inches and will sag about ¼ or ½ of an inch when transporting with hot fluid. Also, multiple tubes, sometimes up to 6 or more, are mounted close together such that there is not enough space between them to install tubular pipe insulation.

Plastic pipes for plumbing and hydronic heating are increasing in market share for residential and commercial use as copper prices increase significantly and flexible plastic piping is becoming easier to install and more reliable. Types of plastic piping used for plumbing are primarily PEX (crosslinked polyethylene) and CPVC (chlorinated PVC). PEX is gaining market share due to its ease of installation and high reliability for fittings and connectors. Also, the flexibility of PEX makes it easy and fast to install. PEX is finding wider use both for hot and cold water and for hot water heating applications both in the US and in Europe. Typical plastic piping sizes for PEX vary from ½ inch to 1¼ inch diameters.

Studies have shown that heat loss from hot water pipes can be substantially reduced by adding polymer foam or fiberglass insulation around the pipes. Typical insulation wall thickness for this insulation is ⅜ to ¾ inch wall thickness. Surprisingly, it has been shown that heat loss (BTU/h/ft) for bare ¾ inch PEX domestic hot water (DHW) piping is greater than for copper piping (31.96 vs 29.64 BTU/h/ft) at 140° F. This is due to higher radiant and convective losses for the PEX versus copper, even though the thermal conductivity of copper is substantially higher than PEX.

It has been shown that by adding ½ inch wall thickness flexible elastomeric insulation to both the copper and the PEX, the heat loss is reduced by 65% for the copper (from 29.64 to 10.3 BTU/h/ft) and 69% for the PEX (from 31.96 to 10.06 BTU/h/ft). The problem with insulating flexible PEX or CPVC pipe is that, different from rigid copper or iron pipe, since the plastic is flexible, it must be supported every 18 to 24 inches for smaller (approx. ½ inch diameter) and every 36 to 48 inches for larger (approx. ¾ to 1 inch diameter) pipe due to its flexibility and tendency to sag. For uninsulated plastic piping this is usually accomplished with a small-width hanger that mounts the piping either in direct contact or nearly in contact (about ⅛ inch) with the supporting structure. This mount does not leave room for insulating material, either polymeric foam or fiberglass, of approximately ½ inch or more wall thickness between the pipe and the support structure, such as a floor joist or wall stud.

Pipe hangers have been developed which can allow room for the foam insulation. However, they are large and bulky and quite expensive and require extra labor. Some such hangers connect over the insulated PEX pipe while others provide an insulation for the pipe and require additional insulation to be installed in short spaces between the mounts. This can leave gaps in the insulation and requires additional labor and is not very compact when there are multiple pipes in close proximity. Also, this system will not work where hydronic pipes require multiple pipes in small spaces.

As such, a need exists for improved support systems and apparatuses for pipes that can insulate the pipes over a substantial length of the pipes.

SUMMARY

The present subject matter provides insulated pipe support sections, systems and related methods. In particular, the present subject matter relates to insulation systems and insulating support body sections for insulating and supporting pipes within structures such as buildings. Methods related to the use of the insulated pipe support apparatuses and systems disclosed herein are also provided.

Thus, it is an object of the presently disclosed subject matter to provide insulated pipe support apparatuses, systems and related methods. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

Figure 1A:
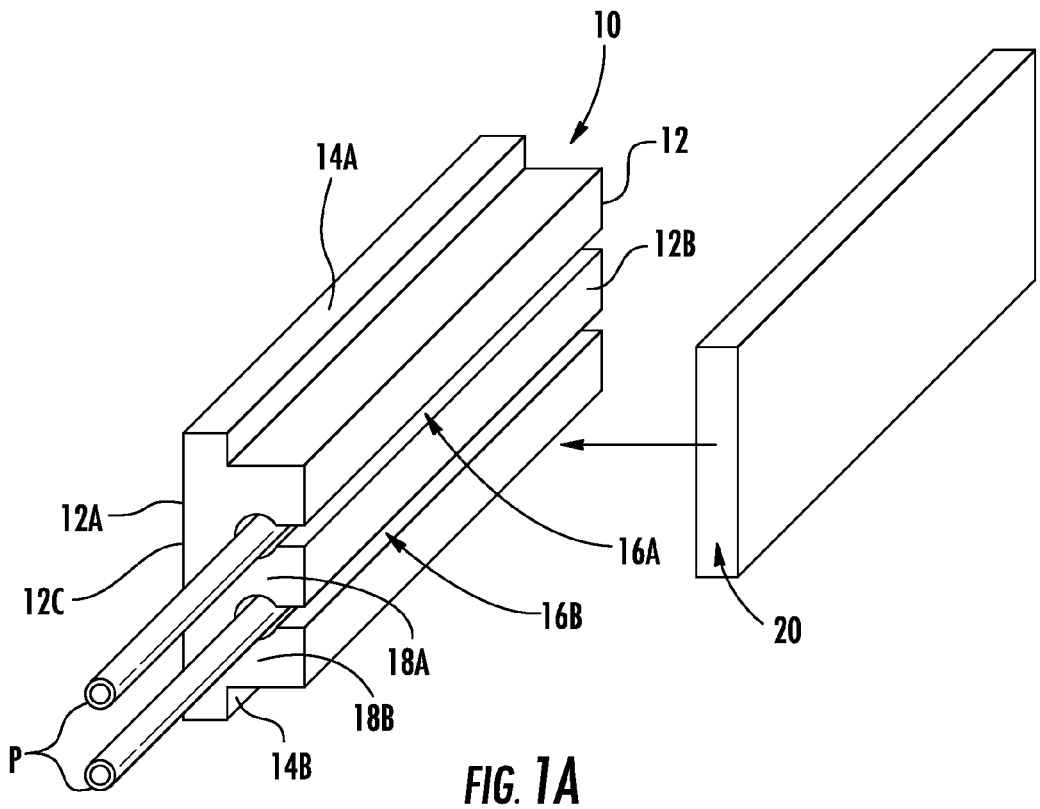
FIG. 1A illustrates a perspective view of a portion of an embodiment of an insulating support system comprising an insulated pipe support section having pipes placed therein and a cover according to the present subject matter.

Repeat use of reference characters in the present specification and drawings is intended to represent the same or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, when a layer or coating is being described in the present disclosure as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5 as examples.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic" is used herein to mean any material formed from a polymer which softens and flows when heated. Such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

Support insulation systems for holding and insulating pipes, such as water pipes or heat transfer pipes, for installation within a structure are provided. The support insulation system can comprise one or more insulating support body sections. Each insulating support body section can comprise a pipe receiving portion having a mounting side and a receiving side. The mounting side of the insulating support body section can have a mounting surface of the respective insulating support body section being configured to reside adjacent a mounting surface of a structure. Within each insulating support body section, at least one channel can be formed through the receiving side such that the insulating support body section forms side walls of the channel. The at least one channel being configured to receive one or more pipes with the side walls of the channels having a strength to support the section of water pipe extending through the channel without need for additional weight bearing supports for supporting the pipes. One or more fasteners can be configured to hold the one or more insulating support body sections to the mounting surface of the structure. In some embodiments, the one or more insulating support body sections can further comprise one or more fastening flanges that extend outward from the pipe receiving portion of the respective insulating support body section along the mounting side and extending the mounting surface of the respective insulating support body section. The one or more insulating support body sections can have a thermal conductivity that is less than the thermal conductivity of the pipes that are to be inserted into the respective channels.

Figure 1B:
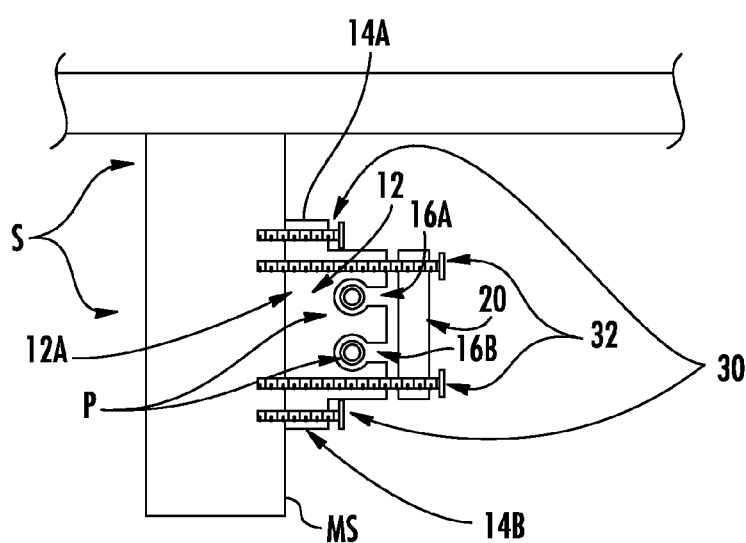
FIG. 1B illustrates a perspective view of the portion of the embodiment of the insulating support system according to FIG. 1A with the insulated pipe support section having pipes placed therein and the cover mounted to an embodiment of a mounting structure according to the present subject matter.

Referring to FIGS. 1A and 1B, for example, an insulating support body section, generally designated 10, is provided that can be used within a support insulation system, such as the one briefly described above. One or more insulating body sections 10 can be aligned to form a substantially continuous length of support insulation. As used herein "substantially continuous length of support insulation" means the one or more insulating body sections cover or are in contact with a large portion of the pipe being supported and insulated. For example, in some embodiments, the substantially continuous length of support insulation that is comprised of the insulating support body sections can extend over at least 30% of the pipes being supported. In some embodiments, the substantially continuous length of support insulation that is comprised of the insulating support body sections can extend over at least 50% of the pipes being supported. In some embodiments, the substantially continuous length of support insulation that is comprised of the insulating support body sections can extend over at least 80% of the pipes being supported. Further, in some embodiments, the substantially continuous length of support insulation that is comprised of the insulating support body sections can extend over at least 95% of the pipes being supported. The amount of insulating support body sections used and the length of the pipes surrounded and covered by the insulation support sections can be determined based on the primary purposes of the insulation support system. If the primary purpose is to provide support for the pipes with some insulation, then less insulating support body sections are needed. If insulating the pipes is a more important purpose, then more insulating support body sections can be used to form a continuous support insulation system that covers and insulates the pipes.

The insulating support body section 10 can comprise a pipe receiving portion 12 having a mounting side 12A and a receiving side 12B. The mounting side 12B of the insulating support body section 10 can have a mounting surface 12C of the respective insulating support body section 10 being configured to reside adjacent a mounting surface MS of a structure S (see FIG. 1B). In the embodiment shown, the insulating support body section 10 further comprises two fastening flanges 14A and 14B that extend outward from the pipe receiving portion 12 of the insulating support body section 10. In the embodiment shown in FIGS. 1A and 1B, the receiving side 12B of the pipe receiving portion 12 of the respective insulating support body section 10 extends about parallel to the mounting side 12A of the pipe receiving portion 12 of the respective insulating body 10.

The two fastening flanges 14A and 14B extend along the mounting side 12A so that the mounting surface 12C of the insulating support body section 10 is extended as well. In the embodiment shown in FIGS. 1A and 1B, two channels 16A and 16B are formed in the insulating support body section 10 through the receiving side 12B such that the insulating support body section 10 forms side walls 18A and 18B of the channels 16A and 16B. Each channel 16A and 16B is configured to receive one or more pipes P with the side walls 18A and 18B of each channel 16A and 16B having a strength to support the section of the pipe P extending through the channel 16A and 16B without need for additional weight bearing supports for supporting the pipes P. In some embodiments, the pipes P can comprise plastic pipes, such as PEX, CPVC, or other flexible pipes. In some embodiments, the pipes P can comprise flexible copper pipes. In some embodiments as shown, the two fastening flanges 14A and 14B can extend about parallel with the channels 16A and 16B in the pipe receiving portion 12 of the insulating support body section 10.

A removable insulating cover 20 can be provided that is configured to close the two channels 16A and 16B. In this manner, insulating material can surround the pipes P within the channels 16A and 16B with the opening of the channels 16A and 16B being covered so that pipes P carrying heated fluid can retain the heat and/or pipes P carrying cooled fluids are insulated to keep the fluid from absorbing heat. This improved insulating effect occurs because the insulating support body section 10 and other similar insulating support body sections have a thermal conductivity that is less than the thermal conductivity of the pipes P that are inserted into the respective channels 16A and 16B as will be explained in more detail below.

As shown in FIG. 1B, in the embodiments, fasteners 30 and 32 can be provided to hold the insulating support body section 10 to the mounting surface MS of the structure S and/or to hold the cover 20 to the insulating support body section 10. For example, the fasteners 30 can be used to engage the fastening flanges 14A and 14B to hold the insulating support body section 10 to the structure S. Further, the fasteners 32 can be used to engage the cover 20 and the insulating support body section 10 to hold the cover 20 to the insulating support body section 10. Additionally, the fasteners 32 are long enough to hold the insulating support body section 10 to the structure S. In this manner, the insulating support body section 10 with the pipes P held within the channels 16A and 16B can be firmly attached to the structure S with the cover 20 closing the channels 16A and 16B to provide insulative support and protection around the pipes P. The fasteners do not go around the pipes P or the insulating support body section 10 or support the pipes P other than to hold the insulating support body section 10 to the mounting surface MS of the structure S.

The fasteners 30 and 32 can be, for example, in some embodiments, nails, screws, bolts with associated nuts, or the like. In some embodiments, the fastening flanges 14A and 14B can comprise mounting recesses for receiving such fasteners 30. For example, the fastening flanges 14A and 14B can comprise mounting apertures for receiving the fasteners 30. Similarly, in some embodiments, the pipe receiving portion 12 of the insulating support body section 10 can comprise one or more mounting structures each for receiving a fastener 32. The mounting structures can comprise apertures extending through one of the side walls 18A and 18B of the channels 16A and 16B. In some embodiments, each of the one or more mounting structures can comprise a recess within the side walls 18A and 18B of the channels 16A and 16B configured to receive a portion of a fastener of the one or more fasteners. In some embodiments, the fastener or fasteners can be an adhesive.

Similarly, the cover 20 can comprise mounting structures, such as apertures pre-formed therein for aligning with the mounting structures in the pipe receiving portion 12 for receiving a fastener 32. The fasteners 32 are used to hold the cover 20 to the insulating support body section 10 and can be sparely used. The fasteners 32 can be spaced out every several feet, such as about every 5 to 10 feet. While shown extending into the structure S, the fasteners 32 need not extend through the insulating support body section 10. For example, the fasteners 32 can extend only into the pipe receiving portion 12. In some embodiments, the fasteners 32 can be protrusions on either the cover 20 or the pipe receiving portion 12 that holdingly fit into receptacles in either the cover 20 or the pipe receiving portion 12. In some embodiments, the fasteners 32 can be snaps. In some embodiments, the fastener or fasteners that can be used to hold the cover 20 to the insulating support body section 10 can be an adhesive.

In some embodiments, the insulating support body section 10 can comprise a rigid or semi-rigid material that has a stiffness to support the piping inserted therein and that can provide good insulative properties. For example, in some embodiments, the insulating support body section 10 can comprise a fiberglass or a rock wool material. In some embodiments, the insulating support body section 10 can comprise a foam material. For example, the insulating support body section 10 can comprise a foam thermoplastic material such as polypropylene foam, polyethylene foam, polyethylene terephthalate (PET) foam, or polystyrene foam. For example, the insulating support body section 10 can comprise a high density polyethylene or a polypropylene. The stiffness of the foam can be such that, once the insulating support body section 10 is attached to the mounting surface MS of the structure S and the pipes P are placed in the insulating support body section 10, the side walls 18A and 18B below the pipes P support the pipes P and hold them in the channels 16A and 16B. Table 1 below shows the compression modulus, which is the same as the bending (or flexular) modulus and can be a measure of stiffness, for some example foam materials that can be used to form the insulating support body section 10.

TABLE 1

COMPRESSION MODULUS FOR PLASTIC FOAMS

| Material Density | Modulus of solid plastic, PSI | Modulus of foam, PSI, assuming .025 gram/cc |
|---|---|---|
| High density polyethylene | 200,000 | 2,500 |
| Low density polyethylene | 20,000 | 500 |
| PET | 145,000 | 1,800 |
| Polypropylene | 217,000 | 2,700 |
| Polystyrene | 362,500 | 4,500 |

These modulus numbers for foam are nominal and are based on approximate values which assume the density reduction from a solid density, approx. about 0.90 g/cc to about 1.1 g/cc for different polymers are reduced to about 2% about 6% of original density by foaming to a density of about 0.02 g/cc to 0.06 g/cc. These foam modulus numbers are relative values and may vary. The higher stiffness foams will perform better as support structures.

The insulating support body section 10 should also have good insulative properties to help keep the fluid travelling through the pipes P at or near the desired or intended temperature. To accomplish this task, the thermal conductivity of the material that comprises the insulating support body section 10 should be low enough to impede the transfer of heat from the pipes P, thereby keeping the temperature of the pipes P at a temperature at or near the temperature of the fluid traveling through the pipes P as the pipes P are heated or cooled by the fluid. Heat transfer is a product of the thermal conductivity of the material through which energy in the form of heat is trying to pass, the thickness of that material through which it is trying to pass, the area of that material, and the change in temperature from a first side of the material exposed to the higher temperature to the second side distal from the first side. For example, heat transfer can be expressed as the following:

$$Q = K * A * \Delta T / \Delta x \tag{1}$$

where:
Q=the heat transfer measured in BTU/min.;
K=thermal conductivity coefficient;
A=the area of the material through which heat is trying to pass;
$\Delta x$=the distance of the thickness of the material through which heat is trying to pass; and ΔT=the change in temperature from a first side of the material exposed to the higher temperature to the second side distal from the first side.

Thus, the thermal conductivity (K) can be calculated by the following equation:

$$K=Q*\Delta x/(A*\Delta T) \quad (2)$$

Examples of the thermal conductivity (or "k" values) of potential foam materials that can comprise the insulating support body sections 10 are set forth in Table 2 below.

TABLE 2

THERMAL CONDUCTIVITY FOR PLASTIC FOAMS

| Material | Thermal Conductivity (the "k" value) (BTU-in)/(h-ft²-F) |
|---|---|
| High density polyethylene | about 0.26-about 0.27 |
| Low density polyethylene | about 0.26-about 0.27 |
| PET | about 0.27-about 0.35 |
| Polypropylene | about 0.22-about 0.23 |
| Polystyrene | about 0.23-about 0.25 |

These foam thermal conductivity numbers in Table 2 are nominal and are based on approximate values based on a densities such as density of about 0.025 g/cc. However, the density of the plastic foam material can range between a density of about 0.02 g/cc to 0.06 g/cc and still have an acceptable "k" value. Thus, the plastic foam material described above with a density of about 0.02 g/cc to 0.06 g/cc can provide sufficient support for the pipes P within the channels 16A and 16B as well as good "k" values for insulation. Therefore, in some embodiments, the thermal conductivity of the one or more insulating support body sections 10 can be between about 0.2 (BTU-in)/(h-ft²-F) and about 0.4 (BTU-in)/(h-ft²-F). In some embodiments, the thermal conductivity of the one or more insulating support body sections 10 is between about 0.2 (BTU-in)/(h-ft²-F) and about 0.35 (BTU-in)/(h-ft²-F). More particularly, in some embodiments, the thermal conductivity of the one or more insulating support body sections 10 is between about 0.22 (BTU-in)/(h-ft²-F) and about 0.27 (BTU-in)/(h-ft²-F). The thermal conductivity of these foams are significantly lower that the thermal conductivity of solid plastic pipes and flexible copper pipes. For example, PEX pipes can have a thermal conductivity of about 2.6 (BTU-in)/(h-ft2-F) to about 3.2 (BTU-in)/(h-ft2-F).

Figure 2:
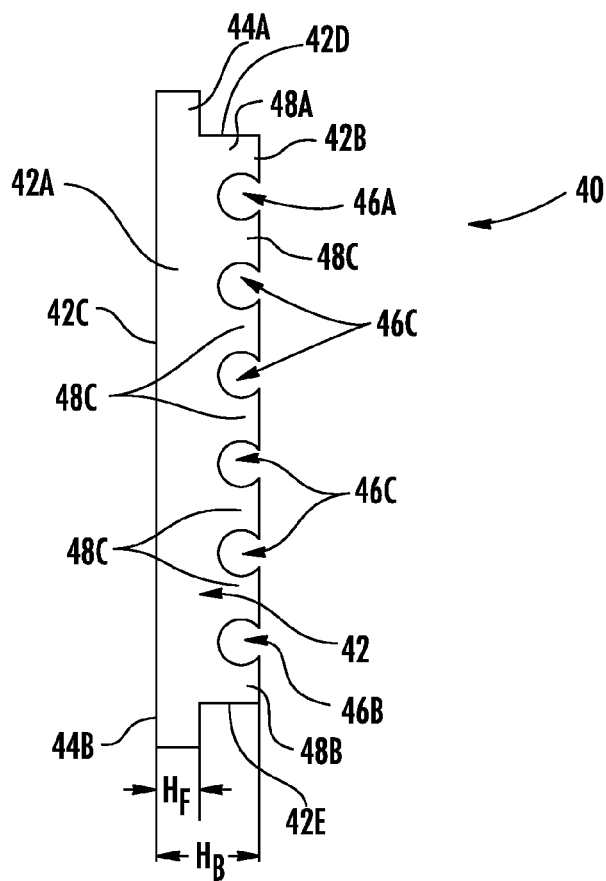
FIG. 2 illustrates a cross-sectional view of an embodiment of an insulated pipe support section that can hold and support a plurality of pipes according to the present subject matter.

FIG. 2 illustrates a cross-sectional view of another embodiment of an insulating support body section, generally designated 40. The insulating support body section can comprise a pipe receiving portion 42 having a mounting side 42A and a receiving side 42B. In the embodiment shown, the insulating support body section 40 further comprises two fastening flanges 44A and 44B that extend outward from the pipe receiving portion 42 of the insulating support body section 40. In the embodiment shown, the receiving side 42B of the pipe receiving portion 42 of the respective insulating support body section 40 extends about parallel to the mounting side 42A of the pipe receiving portion 42 of the respective insulating body 40.

The two fastening flanges 44A and 44B extend along the mounting side 42A so that the mounting surface 42C of the insulating support body section 40 is extended as well. The two fastening flanges 44A and 44B can have a height $H_F$ as measured from the mounting surface 42C of the insulating support body section 40 that is less that a height $H_B$ of the pipe receiving portion 42 of the respective insulating support body section 40 as measured from the mounting surface 42C of the insulating support body section 40. For example, in some embodiments, the height $H_F$ can be between about one third to about one half of the height $H_B$ of the pipe receiving portion 42 of the respective insulating support body section 40. In some embodiments, the height $H_F$ can be about one fourth of the height $H_B$ of the pipe receiving portion 42 of the respective insulating support body section 40.

In the embodiment in FIG. 2, a plurality of channels 46A, 46B, and 46C are formed through the receiving side 42B of the pipe receiving portion 42 of the insulating support body section 40. Each of the channels 46A, 46B, and 46C are configured to receive a section of a separate pipe. The plurality of channels 46A, 46B, and 46C can comprise a first outer channel 46A, a second outer channel 46B and one or more inner channels 46C. As shown in the embodiment in FIG. 2, four inner channels 46C can be provided between the first outer channel 46A and the second outer channel 46B such that six different pipes can run along through an insulative support system comprising a plurality of different insulating support body sections 40.

With the first outer channel 46A, the second outer channel 46B and the inner channels 46C, the insulating support body section 10 forms side walls 48A, 48B, and 48C that can comprise a first outer side wall 48A of the first outer channel 46A that is formed on a first exterior 42D side of the pipe receiving portion 42 of the respective insulating support body section 40 and a second outer side wall 48B of the second outer channel 46B that is formed on a second exterior side 42E of the pipe receiving portion 42 of the respective insulating support body section 40. The first outer side wall 48A and the second outer side wall 48B are not being shared with any of the one or more inner channels 46C. The side walls 48A, 48B, and 48C formed by the insulating support body section 40 can comprise two or more inner side walls 48C. The inner side walls 48C between the first outer channel 46A, the inner channels 46C, and the second outer channel 46B are shared by the respective neighboring channels 46A, 46B, and 46C. Each of the channels 46A, 46B, and 46C is configured to receive one or more pipes with the side walls 48A, 48B, and 48C of the respective channels 46A, 46B, and 46C having a strength to support the section of pipe extending through the respective channels 46A, 46B, and 46C without need for additional weight bearing supports for supporting the pipes. In some embodiments, the inner side walls 48C can have a width (thickness) that is less than the width (thickness) of the first and second outer side walls 48A, 48B, but thick enough to support the pipe section residing in the respective channel 46A, 46C above the respective inner side wall 48C. An insulative cover (not shown in FIG. 2) can be provided and can be secured to the receiving side 42B of the pipe receiving portion 42 of the respective insulating support body section 40 over the channels 46A, 46B, and 46C to ensure that the pipes are surrounded by insulative material. In some embodiments, the channels may be formed so that they close around the pipes at an outer portion to alleviate the need for a cover as explained further below.

In some embodiments, the channels 46A, 46B, and 46C extend into the pipe receiving portion 42 to a depth such that the pipes will reside in a portion of the pipe receiving portion 42 that extends upward (or outward) above the flanges 44A and 44B. Thus, in some embodiments, the side walls 48A, 48B, and 48C end in the pipe receiving portion 42 such that the pipes will reside in a portion of the pipe receiving portion 42 that extends upward (or outward) above the flanges 44A and 44B. In such embodiments, the side walls 48A, 48B, and 48C support the pipe section residing in the respective channels 46A, 46B, and 46C above the respective inner side walls 48C and second outer side wall 48B.

The insulating support body section 40 can provide support for a plurality of pipes and can also provide insulative properties to insulate the pipes therein. In some embodiments, the insulating support body section 40 can comprise a fiberglass or a rock wool material. In some embodiments, the insulating support body section 40 can comprise a foam material. For example, the insulating support body section 40 can comprise a foam plastic material such as polypropylene foam, polyethylene foam, polyethylene terephthalate (PET) foam, or polystyrene foam. For example, the insulating support body section 40 can comprise a high density polyethylene polypropylene. In some embodiments, the thermal conductivity of the one or more insulating support body sections 40 can be between about 0.2 (BTU-in)/(h-ft$^2$-F) and about 0.4 (BTU-in)/(h-ft$^2$-F). In some embodiments, the thermal conductivity of the one or more insulating support body sections 10 is between about 0.2 (BTU-in)/(h-ft$^2$-F) and about 0.35 (BTU-in)/(h-ft$^2$-F). More particularly, in some embodiments, the thermal conductivity of the one or more insulating support body sections 40 is between about 0.22 (BTU-in)/(h-ft$^2$-F) and about 0.27 (BTU-in)/(h-ft$^2$-F).

Figure 3:
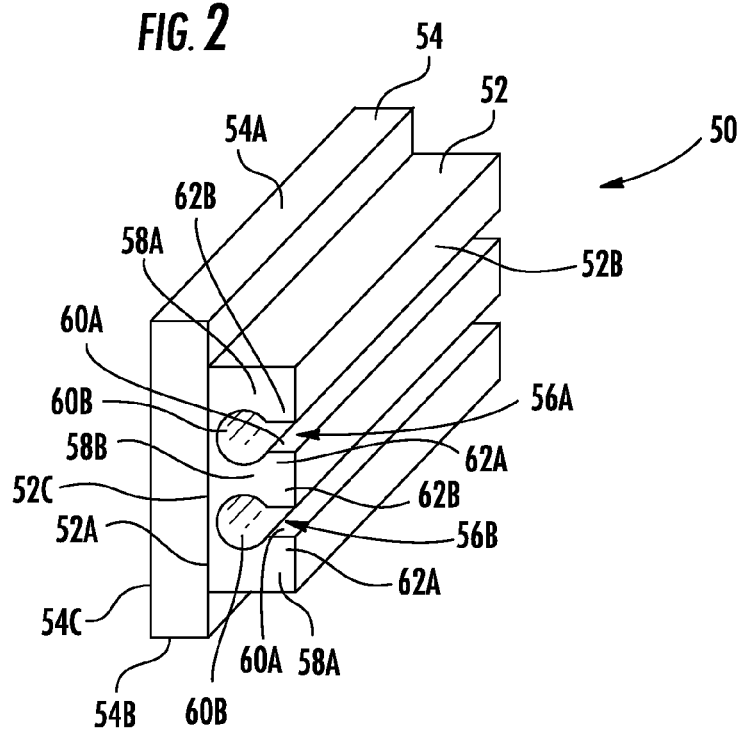
FIG. 3 illustrates a perspective view of another embodiment of an insulated pipe support section that can hold and support a plurality of pipes according to the present subject matter.

Referring to FIG. 3, an insulating support body section, generally designated 50, is provided that can be used within a support insulation system, such as the one briefly described above. The insulating support body section can comprise a pipe receiving portion 52 having a mounting side 52A and a receiving side 52B. The mounting side 52A of the insulating support body section 52 can have a mounting surface 52C of the respective insulating support body section 50. In the embodiment in FIG. 3, two channels 56A and 56B are formed in the insulating support body section 50 through the receiving side 52B such that the insulating support body section 50 forms side walls 58A and 58B of the channels 56A and 56B. Each channel 56A and 56B is configured to receive one or more pipes (not shown) with the side walls 58A and 58B of each channel 56A and 56B having a strength to support the section of pipe P extending through the channel 56A and 56B without need for additional weight bearing supports for supporting the pipes P.

More particularly as shown in FIG. 3, some embodiments, such as insulating support body section 50 can have channels 56A and 56B that each can comprise a neck portion 60A and body portion 60B. The neck portion 60A of each channel 56A and 56B is formed at a surface of the receiving side 52B of the pipe receiving portion 52 and the body portion in which the respective pipes will reside is formed deeper within the pipe receiving portion 52. Thereby, the neck portion 60A of each channel 56A and 56B is proximal to the receiving side 52B of the pipe receiving portion 52 while the body portion 60B of each channel 56A and 56B is distal to the receiving side 52B of the pipe receiving portion 52. The neck portion 60A can have a width between the side walls 58A and 58B of each channel 56A and 56B that is less than a width of the body portion 60B such that each side wall 58A and 58B has a lip 62A, 62B formed at the surface of the receiving side 52B to facilitate retention of a pipe within each respective channel 56A and 56B.

In some embodiments, as stated above, the channels may be formed so that they close around the pipes at an outer portion after insertion to alleviate the need for a cover. For example, the neck portions 60A of each channel 56A and 56B can be a narrow slit to provide access to the body portions 60B to effectively close off the channels after the pipes are inserted into the body portions 60B of each channel 56A and 56B so that the pipes are surrounded by the insulating support body section 50. For example, after insertion, the insulating support body section 50 can be resilient enough and have enough strength so that the lips 62A, 62B close around the pipe near the outer surface of the pipe receiving portion 52 of the insulating support body section 50. In some embodiments, the neck portions 60A of each channel 56A and 56B can be narrow enough to effectively close off the channels after the pipes are inserted into the body portions 60B of each channel 56A and 56B with any gap between the lips 62A, 62B being filled by a caulking or a removable thin strip of foam that can close the narrow gap. For example, a removable thin strip of foam can be inserted into the gap between the lips 62A, 62B to effectively close off the channels.

In the embodiment shown in FIG. 3, a fastening flange member 54 secured to the mounting side 52A of the pipe receiving portion 52 of insulating support body section 50 and extending outward from the pipe receiving portion 52 to form fastening flanges 54A and 54B. In some embodiments, fastening flanges 54A and 54B can extend along the length of the insulating support body section 50 about parallel with the length that the channels 56A and 56B extend within the pipe receiving portion 52 of the insulating support body section 50. The fastening flange member 54 can comprise a material that is more rigid than the insulating support body section 50. For example, fastening flange member 54 can comprise wood, metal, fiberboard, or the like. The insulating support body section 50 can provide support for a plurality of pipes and can also provide insulative properties to insulate the pipes therein. In some embodiments, the insulating support body section 50 can comprise a fiberglass or a rock wool material. In some embodiments, the insulating support body section 50 can comprise a foam material. For example, the insulating support body section 50 can comprise a foam plastic material such as polypropylene foam, polyethylene foam, polyethylene terephthalate (PET) foam, or polystyrene foam. For example, the insulating support body section 50 can comprise a high density polyethylene or a polypropylene. In some embodiments, the thermal conductivity of the one or more insulating support body sections 50 can be between about 0.2 (BTU-in)/(h-ft$^2$-F) and about 0.4 (BTU-in)/(h-ft2-F). In some embodiments, the thermal conductivity of the one or more insulating support body sections 10 is between about 0.2 (BTU-in)/(h-ft2-F) and about 0.35 (BTU-in)/(h-ft2-F). More particularly, in some embodiments, the thermal conductivity of the one or more insulating support body sections 50 is between about 0.22 (BTU-in)/(h-ft$^2$-F) and about 0.27 (BTU-in)/(h-ft$^2$-F).

The fastening flange member 54 can be mounted on the mounting side 54C directly to a mounting surface of a structure so that the mounting side 52B of the insulating support body section 52 can have a mounting surface 52C of the respective insulating support body section being configured to reside adjacent the mounting surface of a structure. In some embodiments, the fastening flanges 54A and 54B comprise mounting recesses for receiving fasteners. For example, the fastening flanges 54A and 54B can comprise mounting apertures for receiving the fasteners. In the embodiment shown, the insulating support body section 50 further comprises two fastening flanges 54A and 54B that extend outward from the pipe receiving portion 52 of the insulating support body section 50. In some embodiments, the receiving side 52B of the pipe receiving portion 52 of the respective insulating support body section 50 extends about parallel to the mounting side 52A of the pipe receiving portion 52 of the respective insulating body 50.

Figure 4A:
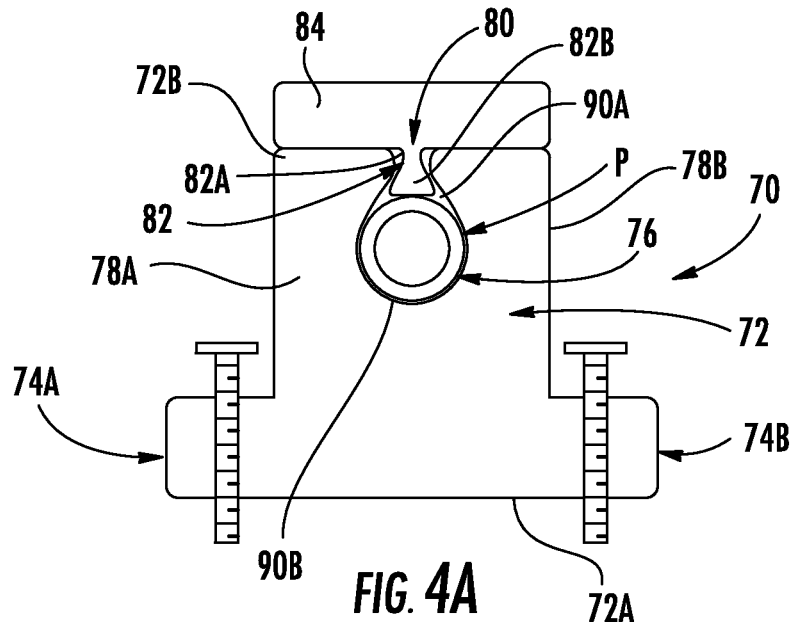
FIGS. 4A and 4B illustrate cross-sectional views of a portion of another embodiment of an insulating support system comprising a cover and an insulated pipe support section configured to support a single pipe according to the present subject matter with FIG. 4A being an enlarged view of the top portion of the insulating system shown in FIG. 4B.
Figure 4B:
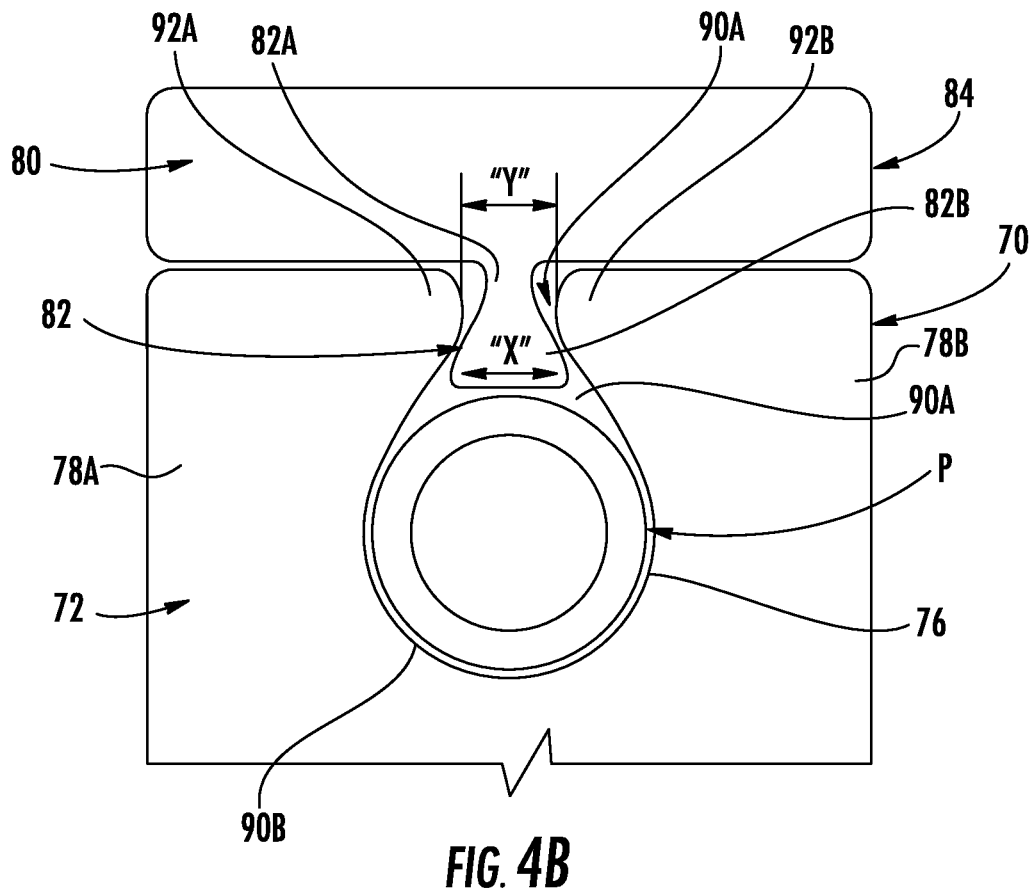

Referring to FIGS. 4A and 4B, a cross-sectional view of another embodiment of an insulating support body section, generally designated 70 is provided. The insulating support body section 70 can be constructed in a similar manner to those described above and will, therefore, not be described in great detail. The insulating support body section 70 can comprise a pipe receiving portion 72 having a mounting side 72A and a receiving side 72B. In the embodiment shown, the insulating support body section 70 further comprises two fastening flanges 74A and 74B that extend outward from the pipe receiving portion 72 of the insulating support body section 70. In the embodiment shown in FIGS. 4A and 4B, the receiving side 72B of the pipe receiving portion 72 of the respective insulating support body section 70 extends about parallel to the mounting side 72A of the pipe receiving portion 72 of the respective insulating body 70. A channel 76 is formed in the insulating support body section 70 through the receiving side 72B such that the insulating support body section 70 forms side walls 78A and 78B of the channel 76. The channel 76 is configured to receive one or more pipes P with the side walls 78A and 78B of the channel 76 having a strength to support the section of pipe P extending through the channel 76 without need for additional weight bearing supports for supporting the pipes P.

A removable insulating cover 80 can be provided that is configured to close the channel 76. The insulating cover 80 comprises a locking member 82 that engages the channel 76 to hold the cover 80 to the insulating support body section 70 in a closed position. In this manner, insulating material can surround the pipe P within the channel 76 with the opening of the channel 76 being covered so that a pipe P carrying heated fluid can retain the heat and/or a pipe P carrying cooled fluids can be insulated to keep the fluid from absorbing heat. For example, the insulating cover 80 can comprise a body 84 with the locking member 82 extending outward from the body 84. Additionally, the locking member 82 of the cover 80 can comprise a neck portion 82A proximal to the body 84 and head portion 82B that is distal from the body 84 with the head portion 82B being larger than the neck portion 82A.

More particularly, the channel 76 of the insulating support body section 70 can comprise a neck portion 90A and body portion 90B similar to the embodiment described above in FIG. 3. The neck portion 90A of the channel 76 is formed at a surface of the receiving side 72B of the pipe receiving portion 72 and the body portion 90B in which the pipe can reside is formed deeper within the pipe receiving portion 72. Thereby, the neck portion 90A of the channel 76 is proximal to the receiving side 72B of the pipe receiving portion 72 while the body portion 90B of the channel 76 is distal to the receiving side 72B of the pipe receiving portion 72. The neck portion 90A can have a width between the side walls 78A and 78B of the channel 76 that is less than a width of the body portion 90B such that each side wall 78A and 78B has a lip 92A, 92B (see FIG. 4B) formed at the surface of the receiving side 72B to facilitate retention of a pipe within the channel 76. When the cover 80 is engaged with the insulating body 70, the locking member 82 can be inserted through the neck portion 90A of the channel 76 between the lips 92A, 92B such that the neck portion 82A of the locking member 82 can reside in neck portion 90A of the channel 76 between the lips 92A, 92B and the head portion 82B of the locking member 82 can reside in the body portion 90B of the channel 76. For example, the head portion 82B of the locking member 82 can have a width X that is wider than the width Y of the neck portion 90A of the channel 76 to facilitate retention of the locking member 82 in the channel and the holding of the cover 80 on the insulating support body section 70.

Figure 5:
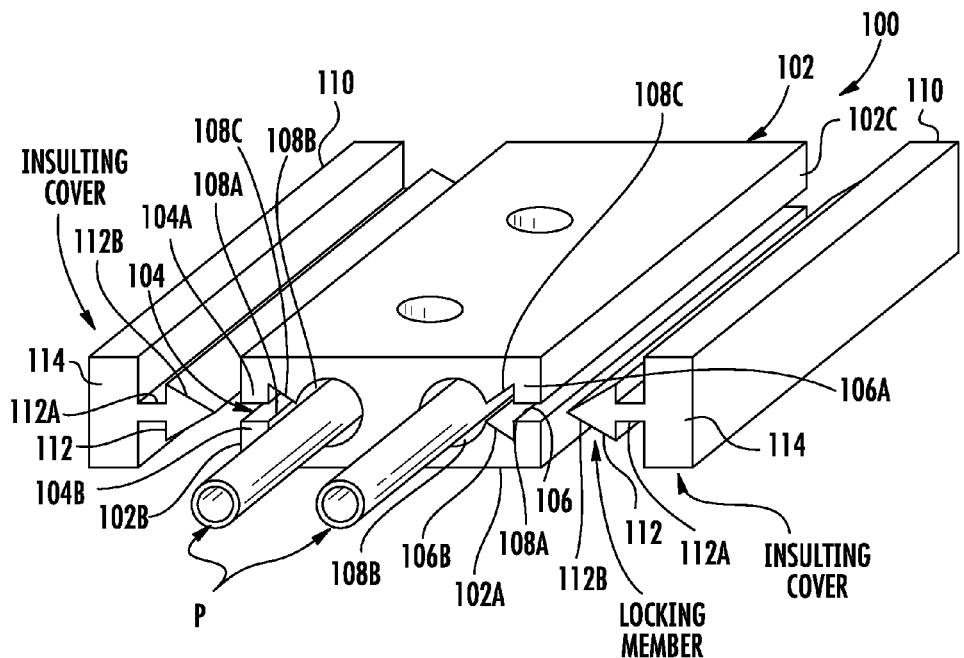
FIG. 5 illustrates a perspective view of a portion of an additional embodiment of an insulating support system comprising covers and an insulated pipe support section configured to support two pipes according to the present subject matter.

Similarly, FIG. 5 shows a further embodiment of an insulating support body section, generally designated 100, is provided. The insulating support body section 100 can be comprised of similar material to those described above. The construction of the insulating support body section 100, however, is somewhat different. As with the embodiments described above, the insulating support body section 100 can comprise a pipe receiving portion 102 having a mounting side 102A and a first receiving side 102B. In some embodiments as shown FIG. 5, however, the first receiving side 102B of the pipe receiving portion 102 of the insulating support body section 100 can extend about perpendicular to the mounting side 102A of the pipe receiving portion 102 of the insulating support body section 100. The first receiving side 102B can comprise a first channel 104 formed within the insulating support body section 100 through the first receiving side 102B. Similarly, as shown in FIG. 5, the insulating support body section 100 can further comprise a second receiving side 102C of the pipe receiving portion 102 of the respective insulating support body section 100 that can extend about perpendicular to the mounting side 102A of the insulating support body section 100 and about parallel to the receiving side 102B of the pipe receiving portion 102 of the insulating support body section 100. The second receiving side 102C can comprise a second channel 106 formed within the insulating support body section 100 through the second receiving side 102C.

The channels 104 and 106 of the insulating support body section 100 can each comprise a neck portion 108A and body portion 108B similar to the embodiments described above. The neck portions 108A of channels 104 and 106 can be formed at a surface of the respective first and second receiving side 102B and 102C of the pipe receiving portion 102. The body portions 108B of channels 104 and 106 in which the pipes P can reside can be formed deeper within the pipe receiving portion 102 than neck portions 108A of channels 104 and 106 in the respective first and second receiving side 102B and 102C. The neck portions 108A can each have a width that is less than a width of the respective body portions 108B such that lips 104A, 104B and 106A, 106B can reside at the surface of the respective first and second receiving side 102B and 102C to facilitate retention of a pipe P within the channels 104 and 106.

As shown in FIG. 5, two removable insulating covers 110 can be provided that are configured to close each of the channels 104 and 106. Each insulating cover 110 can comprise a locking member 112 that engages one of the channels 104 and 106 to hold the respective cover 110 to the insulating support body section 100 in a closed position. In this manner, insulating material can surround the pipe P within the channels 104 and 106 with the opening of the channels 104 and 106 being covered so that a pipe P carrying heated fluid can retain the heat and/or a pipe P carrying cooled fluids are insulated to keep the fluid from absorbing heat.

For example, each of the insulating covers 110 can comprise a body 114 with the locking member 112 extending outward from the body 114. Additionally, the locking member 112 of the cover 110 can comprise a neck portion 112A proximal to the body 114 of the cover 110 and head portion 112B that is distal from the body 114 with the head portion 112B being larger than the neck portion 112A. The neck portions 108A of the channels 104 and 106 can each have a locking head receiving portion 108C into which the respective head portion 112B of the locking members 112 can lockingly fit. When the covers 110 are engaged with the insulating body 100, the locking member 112 of the respective cover 110 can be inserted into the neck portion 108A of the respective channels 104, 106 such that the neck portion 112A of the locking member 112 of the respective cover 110 can reside in neck portion 108A of the respective channels 104, 106 and the head portion 112B of the locking member 112 of the respective cover 110 can reside in the locking head receiving portion 108C of the respective cover 110. In this manner, the locking members 112 of the respective covers 110 can facilitate retention of the covers 110 on the insulating support body section 100.

Figures 6A, 6B:
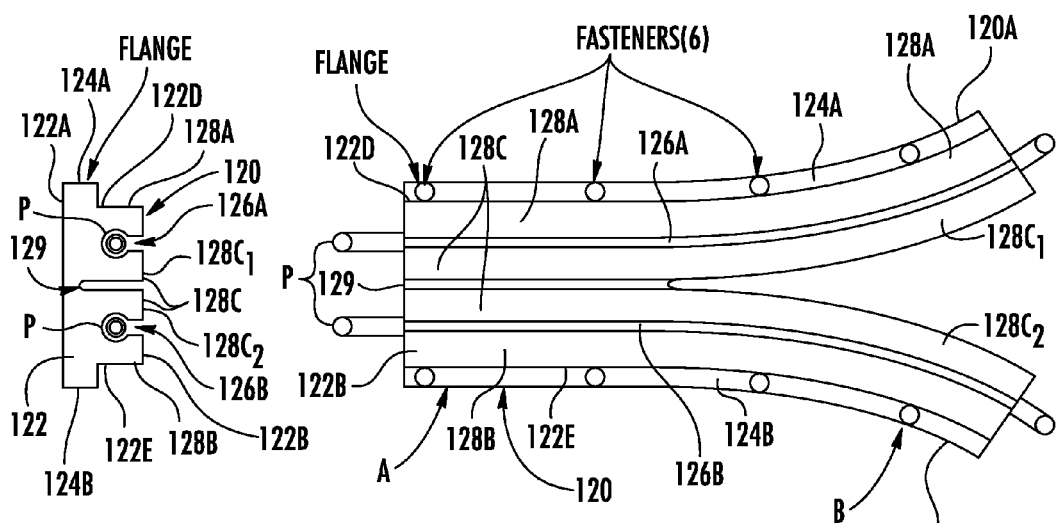
FIG. 6A illustrates a cross-sectional view of a further embodiment of an insulated pipe support section that can hold and support a plurality of pipes according to the present subject matter.
FIG. 6B illustrates a top plan view of the embodiment of the insulated pipe support section according to FIG. 6A installed with the insulated pipe support section holding and supporting a plurality of pipes according to the present subject matter.

Referring to FIGS. 6A and 6B, an additional embodiment of an insulating support body section, generally designated 120 is provided that can be used to accommodate pipes P that run along together, but at some point may diverge. The insulating support body section 120 can be constructed in a similar manner to those described above and will, therefore, not be described in great detail with some additional features highlighted. The insulating support body section 120 can comprise a pipe receiving portion 122 having a mounting side 122A and a receiving side 122B. In the embodiment shown, the insulating support body section 120 can further comprise two fastening flanges 124A and 124B that extend outward from the pipe receiving portion 122 of the insulating support body section 120.

In the embodiment shown in FIGS. 6A and 6B, the receiving side 122B of the pipe receiving portion 122 of the respective insulating support body section 120 extends about parallel to and within the same plane (a vertical plane as shown in FIG. 6A) as the mounting side 122A of the pipe receiving portion 122 of the respective insulating body 120. A first channel 126A and a second channel 126B can be formed in the insulating support body section 120 through the receiving side 122B such that the insulating support body section 20 forms a first outer side wall 128A, a second outer side wall 128B, and an inner side wall 128C. The first outer side wall 128A and a first side of the inner side wall 128C can form the side walls of the first channel 126A. The second outer side wall 128A and a second side of the inner side wall 128C can form the side walls of the second channel 126B. In this manner, the inner side wall 128C is shared by the neighboring first channel 126A and the second channel 126B. Each of the first and second channels 126A and 126B is configured to receive one or more pipes P with the side walls 128A, 128B, and 128C having a strength to support the section of pipe P extending through the respective channel 126A and 126B without need for additional weight bearing supports for supporting the pipes P. The first outer side wall 128A of the first channel 126A can be formed on a first exterior side 122D of the pipe receiving portion 122 of the insulating support body section 120. Similarly, the second outer side wall 128B of the second outer channel 126B can be formed on a second exterior side 122E of the pipe receiving portion 122 of the insulating support body section 120. Thus, the first outer side wall 128A and the second outer side wall 128B only form a side wall for a single channel and are not shared with the other respective channel.

To permit the insulating support body section 120 to diverge as the pipes P diverge from each other, the inner side wall 128C can comprise a separation groove 129 to allow the separation of the insulating support body section 120 along each of the separation grooves as required by an installation of piping within the structure in which the pipes P are being installed. In particular, when the pipes run beside each other, the insulating support body section 120 can stay intact such that no separation is required or performed along the separation groove 129 as shown in portion A of the insulating support body section 120. As the pipes P need to diverge, the insulating support body section 120 can be separated along the separation groove 129, for example, by cutting the insulating support body section 120 with a knife along the separation groove 129, to separate the insulating support body section 120 into body sections 120A and 120B, such that inner side wall 128C is separated into a first inner side wall $128C_1$ and a second inner side wall $128C_2$ as shown in portion B of the insulating support body section 120.

Figure 7:
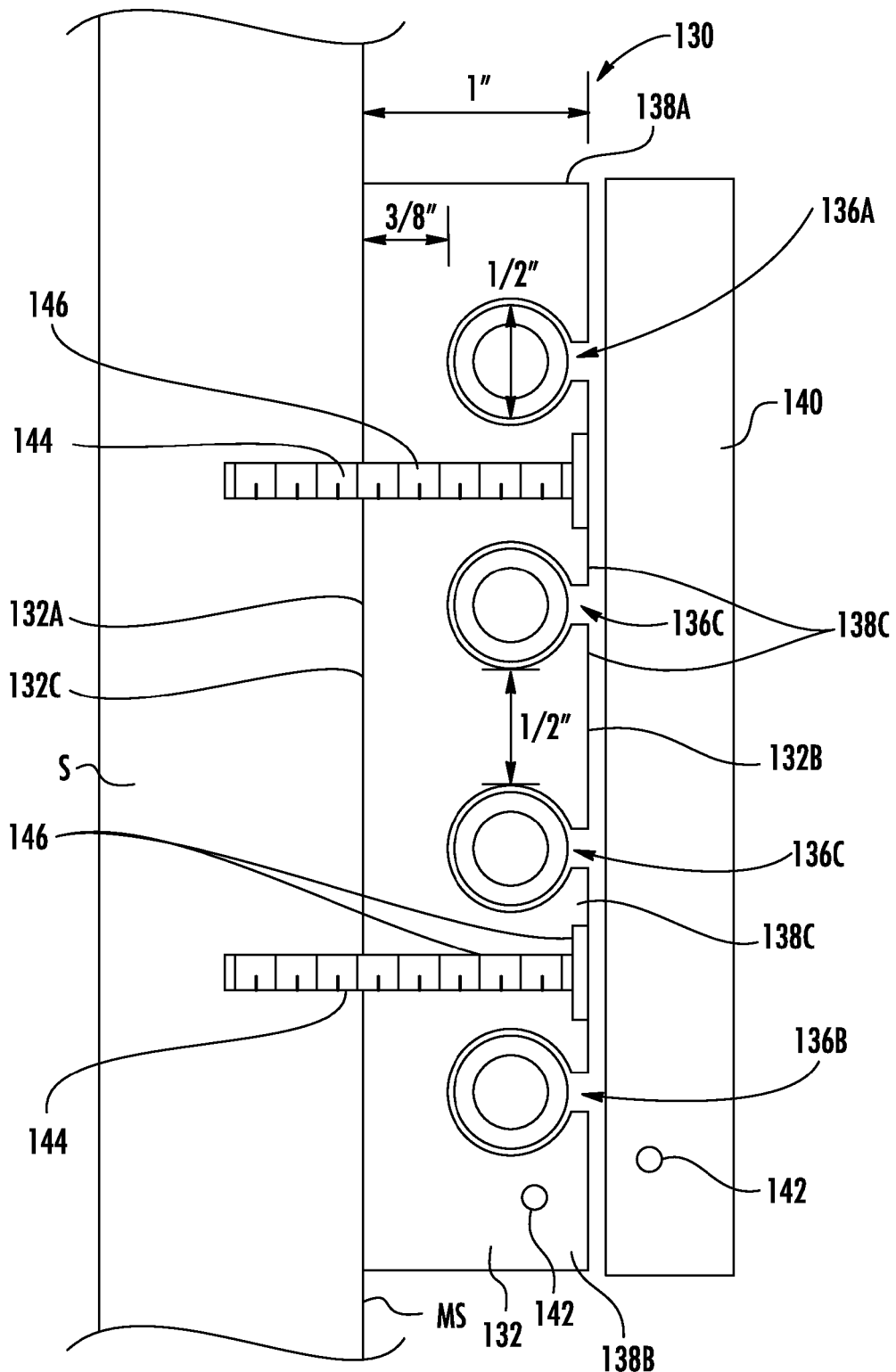
FIG. 7 illustrates a cross-sectional view of an additional embodiment of an insulating support system comprising an insulated pipe support section and a cover with the insulated pipe support section having pipes placed therein mounted to an embodiment of a mounting structure according to the present subject matter.

Referring to FIG. 7, a cross-sectional view of a further embodiment of an insulating support body section, generally designated 130, is provided that can be used within a support insulation system. The insulating support body section 130 can be comprised of similar material to those described above. The insulating support body section 130 can comprise a pipe receiving portion 132 having a mounting side 132A and a receiving side 132B. The mounting side 132A of the insulating support body section 130 can have a mounting surface 132C of the respective insulating support body section being configured to reside adjacent a mounting surface MS of a structure S. A plurality of channels 136A, 136B and 136C are formed in the insulating support body section 130 within the receiving side 132B of the pipe receiving portion 132 of the insulating support body section 130 with each channel 136A, 136B and 136C configured to receive a section of a separate pipe P. In particular, the plurality of channels can comprise a first outer channel 136A, a second outer channel 136B and inner channels 136C such that a first outer side wall 138A of the first outer channel 136A is formed on a first exterior side of the pipe receiving portion 132 of the respective insulating support body section 130 and a second outer side wall 138B of the second outer channel 136B is formed on a second exterior side of the pipe receiving portion 132 of the insulating support body section 130 with the first outer side wall 138A and the second outer side wall 138B not being shared with any of the inner channels 136C. The inner side walls 138C between the first outer channel 136A, the inner channels 136C, and the second outer channel 136B are shared by the respective neighboring channels of the first outer channel 136A, the inner channels 136C, and the second outer channel 136B.

A removable insulating cover 140 can be provided that is configured to close the channels 136A, 136B and 136C. In this manner, insulating material can surround the pipes P. The cover 140 and the insulating support body section 130 can be secured together by having matching attachment apertures 142 within both the cover 140 and the insulating support body section 130. Fasteners, such as ties, may be placed through the attachment apertures 142 in the cover 140 and the insulating support body section 130. Additionally, fasteners 144 can be provided to hold the insulating support body section 130 to the mounting surface MS of the structure S and/or to hold the cover 140 to the insulating support body section 130. For example, the fasteners 144 can be used to hold the cover 140 to the insulating support body section 130. Additionally, the fasteners 144 are long enough to hold the insulating support body section 130 to the structure S. As shown in FIG. 7, the pipe receiving portion 132 of the insulating support body section 130 can comprise mounting structures 146 for receiving each fastener 144. The mounting structures 146 can comprise apertures extending through and/or recesses in one or more of the side walls 138C.

Figure 8:
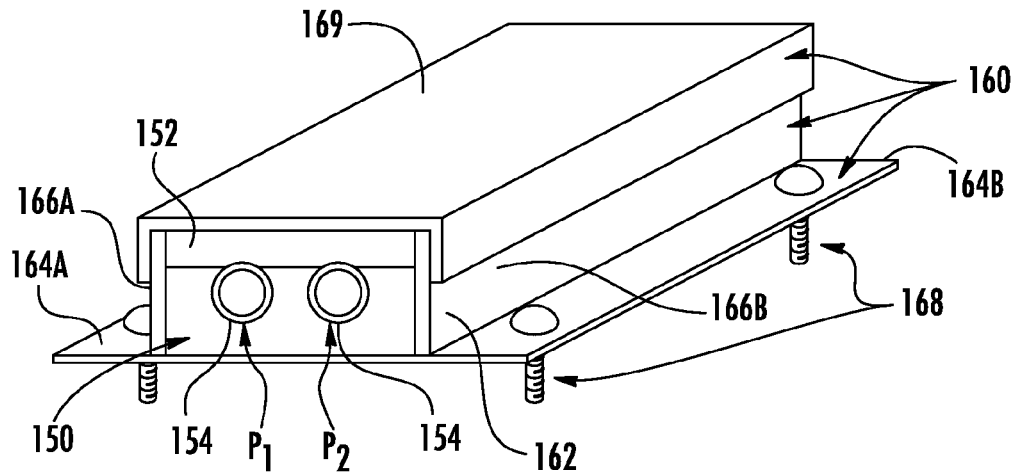
FIG. 8 illustrates a perspective view of a portion of an embodiment of an insulating support system comprising insulated pipe support sections, covers, and casing structures according to the present subject matter.
Figure 8A:
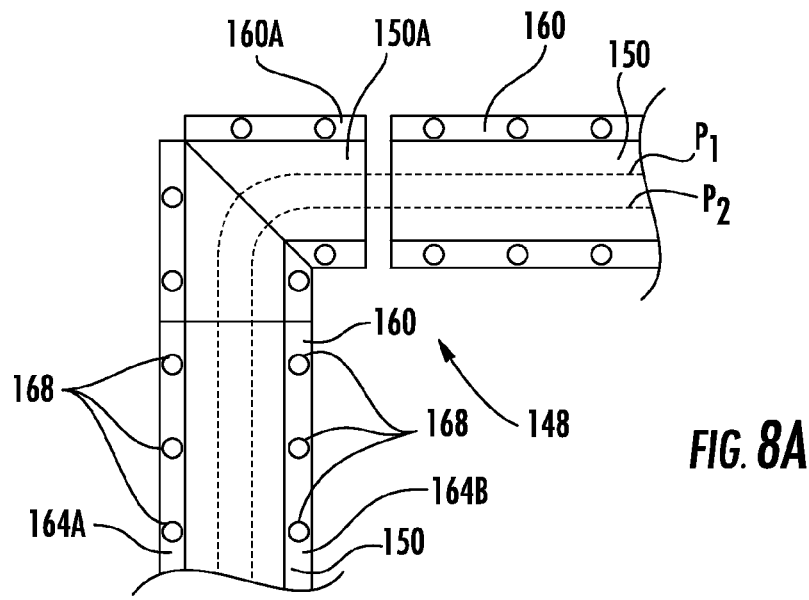
FIG. 8A illustrates a top plan view of the embodiment of the insulating support system showing multiple insulated pipe support sections according to FIG. 8.
Figure 8B:
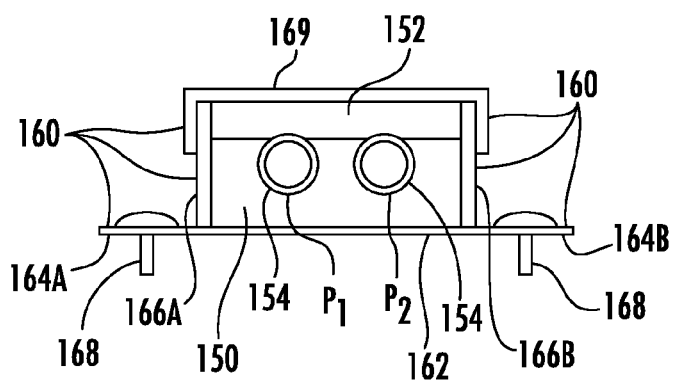
FIG. 8B illustrates a cross-sectional view of a portion of the embodiment of the insulating support system according to FIGS. 8 and 8A.

FIGS. 8, 8A and 8B show another embodiment of a support insulation system, generally designated 148 (see FIG. 8A), for insulating one or more pipes $P_1$ and $P_2$ (see FIGS. 8 and 8B and shown as dotted lines in FIG. 8A). The support insulation system 148 can comprise a plurality of insulating support body sections 150, 150A with matching covers 152 like the one shown in FIGS. 8 and 8B. Each insulating support body section 150, 150A can have one or more channels 154 formed therein for receiving pipes $P_1$ and $P_2$ as described above with the other body section embodiments. As seen in FIG. 8, the insulating support body sections can be aligned to form a substantially continuous length of support insulation.

The support insulation system 148 can comprise one or more casing structures 160 that can hold and support the plurality of insulating support body sections 150 and covers 152. Each casing structure 160 can comprise a mounting base 162 that can include fastening flanges 164A and 164B that extend outward from mounting walls 166A and 166B. In some embodiments, each mounting base 162 can be a single unitary structure. In some embodiments, each mounting base 162 can be two L-shaped structures. The fastening flanges 164A and 164B can be secured by fasteners 168 to a mounting surface of a structure in which the pipes $P_1$ and $P_2$ are being installed. Each casing structure 160 can comprise a cover 169 that can be secured to the corresponding mounting base 162. One or more insulating support body sections 150 can be placed in each casing structure 160. In some embodiments of the support insulation system 148, each insulating support body section 150 can have a corresponding casing structure 160 as shown in FIG. 8A. In some embodiments of the support insulation system 148, each casing structure 160 can have multiple insulating support body section 150 placed therein. The cover 169 and the mounting base 162 of the casing structures 160 can comprise a rigid protective material. For example, in some embodiments, the cover 169 and the mounting base 162 of the casing structures 160 can comprise wood or metal. In some embodiments, the cover 169 and the mounting base 162 of the casing structures 160 can comprise a solid plastic polymer material. The casing structures 160 can aid in protecting pipes $P_1$ and $P_2$ contained within the insulating support body sections 150. In some embodiments, the casing structures 160 can fully enclose and encase the one or more insulating support body section 150. The casing structures 160 can be used to protect and support pipes $P_1$ and $P_2$ within two structures and that extend between the two structures, such as two buildings. As shown in FIG. 8A, some insulating support body sections 150A and casing structures 160A can include a bend or angle to accommodate a turn or angle in the pipes $P_1$ and $P_2$. For example, the insulating support body sections 150A and casing structures 160A can be configured to accept pipes or pipe elbows that are angled at 45°, 90°, or 135°.

Figure 9A:
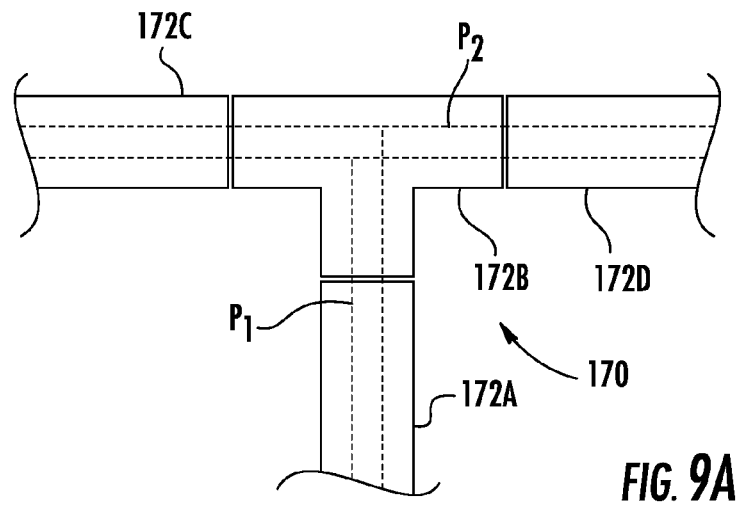
FIG. 9A illustrates a top plan view of a portion of another embodiment of an insulating support system according to the present subject matter.
Figure 9B:
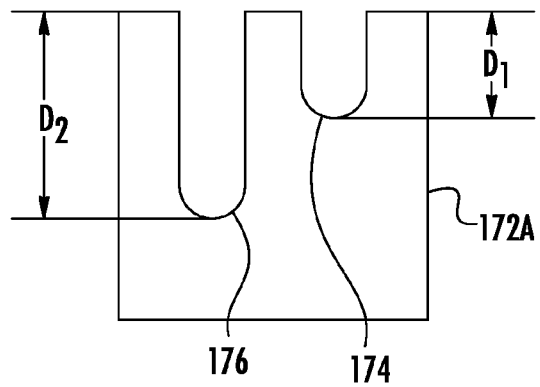
FIG. 9B illustrates a cross-sectional view of a portion of the embodiment of the insulating support system according to FIG. 9A.

As shown in FIGS. 9A and 9B, another embodiment of a support insulation system, generally designated 170, (see FIG. 9A) is provided for insulating one or more pipes $P_1$ and $P_2$ (shown as dotted lines). The support insulation system 170 can comprise a plurality of insulating support body sections 172A, 172B, 172C, and 172D. The insulating support body sections 172A, 172B, 172C, and 172D can comprise first channels 174 (see FIG. 9B) that extend to a first depth $D_1$ in the insulating support body sections 172A, 172B, 172C, and 172D and second channels 176 (see FIG. 9B) that extend to a second depth $D_2$ in the insulating support body sections 172A, 172B, 172C, and 172D that is deeper in the respective insulating support body sections 172A, 172B, 172C, and 172D. Thereby, the pipes within the channels 174 can run at the first depth $D_1$ and the pipes within the channels 176 can run at the second depth $D_2$ so that the first set of pipes $P_1$ can cross under top of the second set of pipes $P_2$.

The plurality of insulating support body sections 172A, 172B, 172C, and 172D can be aligned with each other and mounted to the structure by a plurality of fasteners so that the channels 174 and 176 are properly aligned to receive the pipes so that the pipes are properly aligned within the structure. As shown in FIG. 9A, the insulating support body section 172B is a T-shaped body section to accommodate one or more T-shaped pipes. With the channels 174 having the first depth $D_1$ and the channels 176 having the second depth $D_2$, the t-shaped pipe elbows can be used with the pipes $P_2$ crossing over top of the pipes $P_1$. As seen in FIG. 9A, the insulating support body sections 172A, 172B, 172C, and 172D can be aligned to form a substantially continuous length of support insulation.

Figure 10:
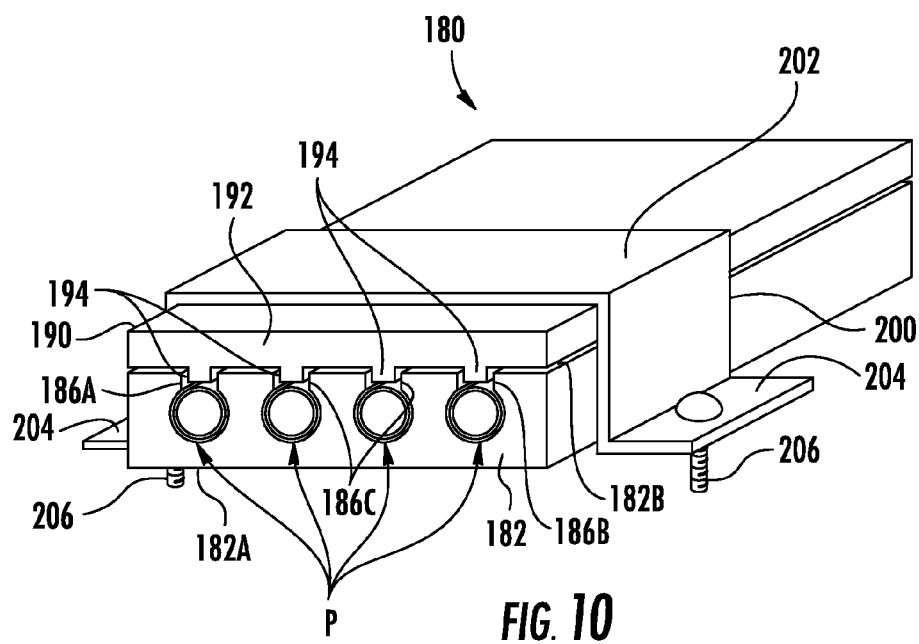
FIG. 10 illustrates a perspective view of a portion of another embodiment of an insulating support system comprising an insulated pipe support section having pipes placed therein and a cover according to the present subject matter.

As shown in FIG. 10, another embodiment of an insulating support body section, generally designated 180, is provided that can be used within a support insulation system. The insulating support body section 180 can be comprised of similar material to those described above. The insulating support body section 180 can comprise a pipe receiving portion 182 having a mounting side 182A and a receiving side 182B. A plurality of channels 186A, 186B and 186C are formed in the insulating support body section 180 within the receiving side 182B of the pipe receiving portion 182 of the insulating support body section 180 with each channel 186A, 186B and 186C configured to receive a section of a separate pipe P. A removable insulating cover 190 can be provided that is configured to close the channels 186A, 186B and 186C. The cover 190 can comprise a body 192 with protrusions 194 extending from the body 192. The protrusions 194 correspond to and can extend into the respective channels 186A, 186B and 186C when the cover 190 is in a closed position. In this manner, insulating material can surround the pipes P.

The cover 190 and the insulating support body section 180 can be secured in place and to the mounting surface of the structure in which the pipes P are being installed by fastener brackets 200 that comprise a u-shaped body 202 and two fastening flanges 204. The fastener brackets 200 can be placed around the cover 190 and insulating support body section 180 with fasteners 206 inserted in the fastening flanges 204 for securing the fastener brackets 200 to the structure in which the pipes P are being installed. The fastener brackets 200 can hold the cover 190 and the insulating support body section 180 in place and can secure the insulating support body section 180 on the respective structure.

Figure 11A:
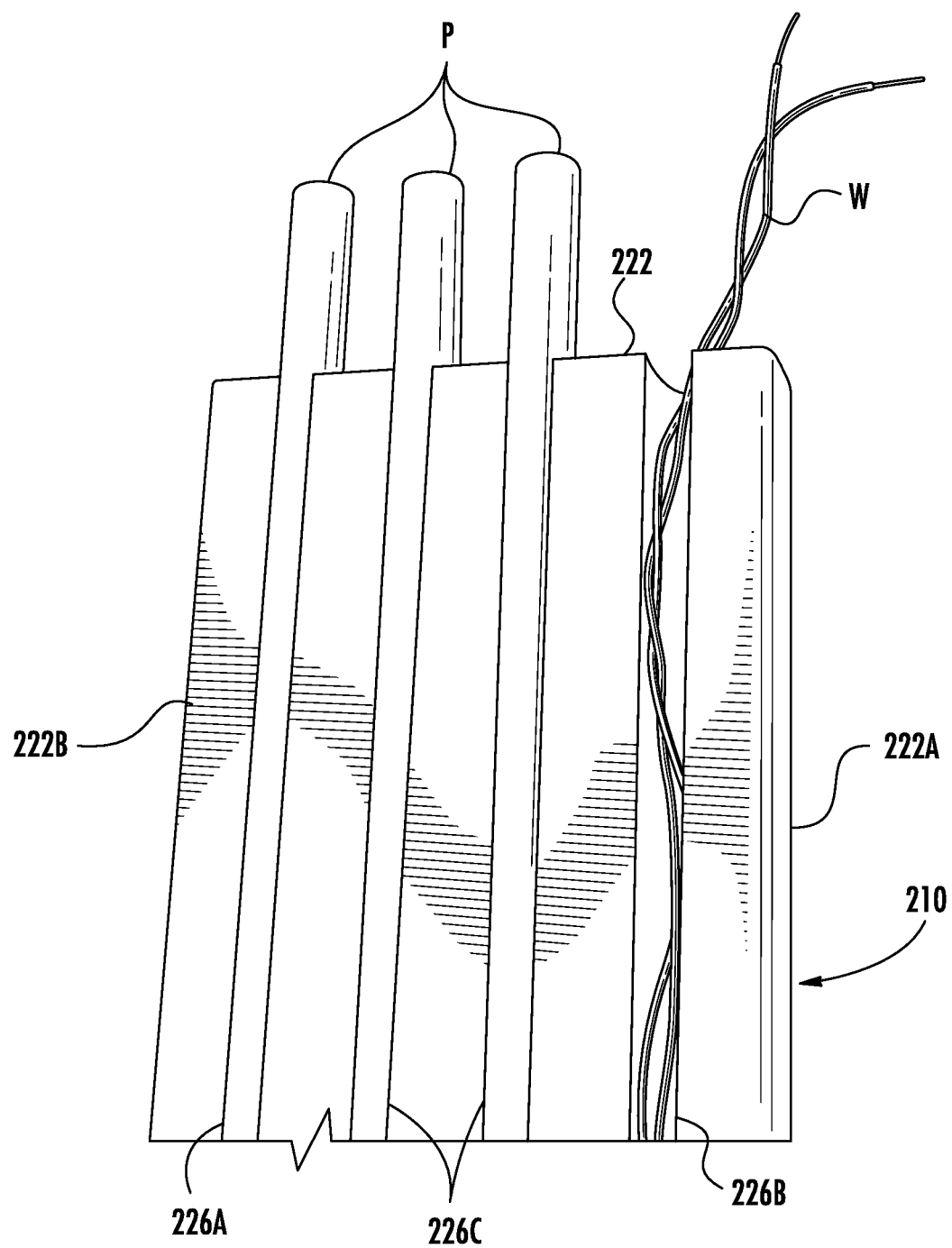
FIG. 11A illustrates a perspective view of a portion of an embodiment of an insulated pipe support section of another embodiment of an insulating support system that can hold and support a plurality of pipes and other accompanying equipment, such as wiring according to the present subject matter.
Figure 11B:
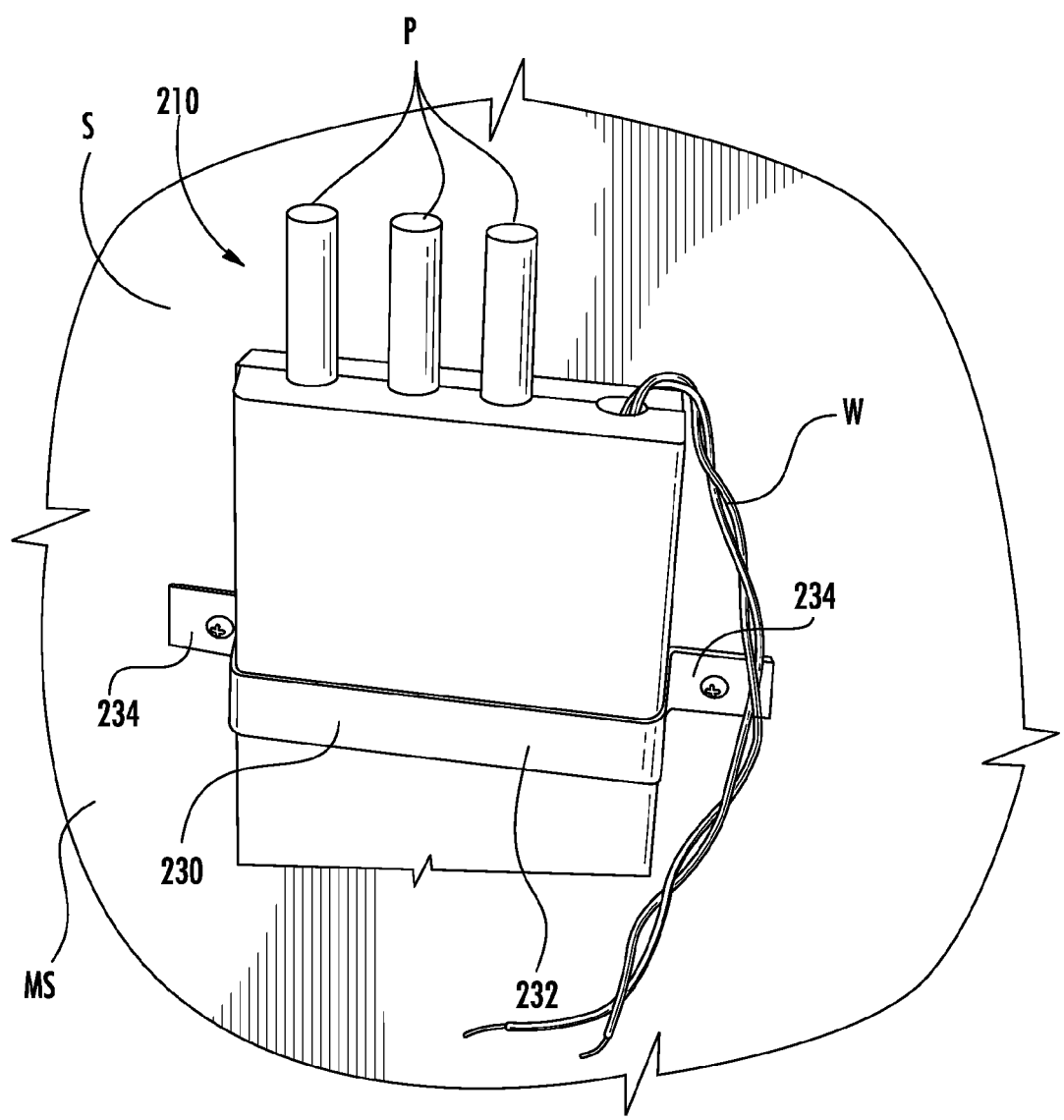
FIG. 11B illustrates a perspective view of the embodiment of an insulating support system that can hold and support a plurality of pipes and other accompanying equipment, such as wiring according to FIG. 11A.

As shown in FIGS. 11A and 11B, embodiment of an insulating support body section, generally designated 210, is provided that can be used within a support insulation system to support pipes P as well as electrical wiring W. The insulating support body section 210 can comprised similar material to those described above. The insulating support body section 210 can comprise a pipe receiving portion 222 having a mounting side 222A and a receiving side 222B. A plurality of channels 226A, 226B and 226C are formed in the insulating support body section 220 within the receiving side 222B of the pipe receiving portion 222 of the insulating support body section 220. As shown in FIGS. 11A and 11B, each channel 226A, 226B and 226C can be configured to receive a section of a separate pipe P or electrical wiring W. For example, the channels 226A and 226C can hold pipes P, while the channel 226B can hold the electrical wiring W. It is understood that different channels can hold either pipes or electrical wiring. A removable insulating cover can be provided that is configured to close the channels 226A, 226B and 226C. In this manner, insulating material can surround the pipes P and electrical wiring W to protect and/or insulate the pipes P and electrical wiring W.

As shown in FIG. 11B, the cover and the insulating support body section 220 can be secured in place and to the mounting surface MS of the structure S in which the pipes P are being installed by fastener brackets 230 that comprise a u-shaped body 232 and two fastening flanges 234. The fastener brackets 230 can be placed around the cover and insulating support body section 220 and can be secured to the structure S in which the pipes P and electrical wiring W are being installed. The fastener brackets 200 can hold the cover and the insulating support body section 220 in place and can secure the insulating support body section 180 on the respective structure S.

These and other modifications and variations to the present subject matter may be practiced by those of ordinary skill in the art, without departing from the spirit and scope of the present subject matter, which is more particularly set forth herein above. In addition, it should be understood the aspects of the various embodiments may be interchanged both in whole and in part. Furthermore, those of ordinary skill in the art will appreciate that the foregoing description is by way of example only, and is not intended to limit the present subject matter.

What is claimed is:

1. An insulating support body section of support insulation for holding and insulating pipes installed within a structure, the insulating support body section comprising:
   a pipe receiving portion having a mounting side and a receiving side, the mounting side having a mounting surface being configured to reside adjacent a mounting surface of a structure; and
   at least one channel formed within the pipe receiving portion through the receiving side such that the pipe receiving portion forms side walls of the channel, the at least one channel being configured to receive one or more pipes with the side walls of the at least one channel having a strength to support the section of pipe extending through the channel without need for additional weight bearing supports; and
   one or more fastening flanges that extend outward from the pipe receiving portion of a respective insulating body along the mounting side to extend the mounting surface of the respective insulating body;
   wherein the insulating support body section has a thermal conductivity that is less than a thermal conductivity of the one or more pipes that are to be inserted into at least one channel;
   wherein the at least one channel comprises a neck portion and body portion with the neck portion of the at least one channel formed at a surface of the receiving side of the pipe receiving portion and being proximal to the receiving side of the pipe receiving portion and the body portion of the at least one channel being distal to the receiving side of the pipe receiving portion, the neck portion of the at least one channel having a width between the side walls of the channel that is less than a width of the body portion of the at least one channel such that each side wall has a lip formed at the surface of the receiving side to facilitate retention of a pipe within the at least one channel.

2. The insulating support body section of support insulation according to claim 1, further comprising a removable insulating cover configured to reside over the at least one channel to close the at least one channel.

3. The insulating support body section of support insulation according to claim 1, wherein the at least one channel comprises a plurality of channels within the receiving side of the pipe receiving portion, each channel configured to receive a section of a separate pipe.

4. The insulating support body section of support insulation according to claim 3, wherein the side walls comprise inner side walls with each of the inner side walls adjacent to each other being separated from each other by a separation groove to allow a separation of the inner side walls along each of the separation grooves as required by an installation of pipes within the structure.

5. The insulating support body section of support insulation according to claim 1, wherein the thermal conductivity of the insulating support body section is between about 0.2 (BTU-in)/(h-ft$^2$-F) and about 0.4 (BTU-in)/(h-ft$^2$-F).

* * * * *